(12) United States Patent
Hellbusch (10) Patent No.: US 10,993,363 B1
(45) Date of Patent: May 4, 2021

(54) TRAILER FOR A SELF-PROPELLED SWATHER

(71) Applicant: James A. Hellbusch, Columbus, NE (US)

(72) Inventor: James A. Hellbusch, Columbus, NE (US)

( * ) Notice: Subject to any disclaimer, the term of this patent is extended or adjusted under 35 U.S.C. 154(b) by 0 days.

(21) Appl. No.: 15/969,130

(22) Filed: May 2, 2018

Related U.S. Application Data (63) Continuation of application No. 14/801,268, filed on Jul. 16, 2015, now Pat. No. 9,986,675.

(51) Int. Cl.
| | | |
|---|---|---|
| *A01B 73/00* | (2006.01) | |
| *A01D 75/00* | (2006.01) | |
| *B62D 63/08* | (2006.01) | |
| *B62D 63/06* | (2006.01) | |
| *B60P 1/43* | (2006.01) | |
| *B60P 3/06* | (2006.01) | |

(52) U.S. Cl.
CPC ............ *A01B 73/00* (2013.01); *A01D 75/002* (2013.01); *B60P 1/43* (2013.01); *B60P 3/064* (2013.01); *B62D 63/061* (2013.01); *B62D 63/08* (2013.01)

(58) Field of Classification Search
CPC ......... A01B 73/00; A01D 75/002; B60P 1/43; B60P 3/064; B62D 63/08; B62D 63/061
See application file for complete search history.

(56) References Cited

U.S. PATENT DOCUMENTS

| | | | |
|---|---|---|---|
| 2,705,081 A | 10/1953 | Jacobs | |
| 3,913,934 A | 10/1975 | Koehn et al. | |
| 4,119,224 A | 10/1978 | Moody | |
| 4,374,592 A | 2/1983 | Geary et al. | |
| 5,118,245 A * | 6/1992 | Dunkel | B62D 21/16 280/638 |
| 5,419,577 A | 5/1995 | Murray | |
| 5,924,754 A | 7/1999 | Kuhns | |
| 6,120,235 A * | 9/2000 | Humphries | B60P 3/12 280/656 |
| 6,644,708 B1 | 11/2003 | Grzegorzewski et al. | |
| 6,746,040 B2 | 6/2004 | Bordeleau et al. | |
| 7,287,947 B2 | 10/2007 | Smith | |
| 8,662,525 B1 | 3/2014 | Dierks et al. | |
| 8,702,119 B2 | 4/2014 | Silz | |
| 8,910,989 B1 | 12/2014 | Boltz | |
| 9,290,215 B2 | 3/2016 | Smith | |
| 9,527,539 B1 * | 12/2016 | Hellbusch | B62D 63/061 |
| 2019/0104673 A1 * | 4/2019 | Potter | A01B 73/00 |

* cited by examiner

*Primary Examiner* — Saul Rodriguez
*Assistant Examiner* — Ashley K Romano
(74) *Attorney, Agent, or Firm* — Dennis L. Thomte; Thomte Patent Law Office LLC (57) ABSTRACT

A trailer is provided for having a self-propelled swather mounted thereon. The trailer includes first and second caster wheel supports and first and second drive wheel supports. The caster wheel supports are selectively movable being stowed and support positions. The drive wheel supports are selectively movable between horizontally disposed and vertically disposed positions. Each of the caster wheel supports includes a caster wheel turning assembly to partially pivot the associated caster wheel as the swather is backed onto the trailer. The trailer also includes extenders for attachment to first and second ramps. The extenders may be stowed on the bumper.

10 Claims, 10 Drawing Sheets

FIG. 8

TRAILER FOR A SELF-PROPELLED SWATHER

CROSS REFERENCE TO RELATED APPLICATION

This is a Continuation Application of application Ser. No. 14/801,268 filed Jul. 16, 2015, entitled TRAILER FOR A SELF-PROPELLED SWATHER.

BACKGROUND OF THE INVENTION

Field of the Invention

This invention relates to a trailer for a self-propelled swather and more particularly relates to a trailer for a self-propelled swather which may be selectively adjusted to accommodate various sizes and models of swathers. Even more particularly, this invention relates to a trailer for a self-propelled swather which includes structure which causes the caster wheels thereof to pivot to a proper trailing position as the swather is driven from the trailer.

Description of the Related Art

Large self-propelled swathers, sometimes called windrowers, are frequently loaded onto trailers for transport from one field to another or from one location to another. The swathers vary in length and width which makes it difficult to provide a trailer which will accommodate different sizes of swathers. Many of the current self-propelled swathers, such as some of those manufactured by New Holland, have a pair of steerable drive wheels at the forward end thereof and a pair of caster wheels at the rearward end thereof. The swathers of this type are usually backed onto the trailer from the rearward end of the trailer. When the swather is backed onto the trailer, the caster wheels at the rearward end of the trailer pivot 180 degrees from their normal field position whereby the axles of the caster wheels are positioned in a trailing position with respect to the vertical or substantially vertical pivot axis of the caster wheels and remain in that position while the swather is on the trailer.

When the swather is to be unloaded from the trailer, the swather is driven rearwardly off the trailer. However, as the swather is initially moved rearwardly from the trailer, the caster wheels may swing in many different directions and may move off the caster wheel tracks or platforms which may result in damage to the caster wheels or the trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A trailer is provided for a self-propelled swather with the swather having a forward end, a rearward end, a first side, a second side, a first drive wheel at the first side thereof adjacent the forward end thereof, a second drive wheel at the second side thereof adjacent the forward end thereof, a first caster wheel at the first side thereof adjacent the rearward end thereof, a second caster wheel at the second side thereof adjacent the rearward end thereof, with the forward end of the swather configured to have a swather head selectively removably attached thereto.

The trailer includes a wheeled frame having a forward end, a rearward end, a first side and a second side. A hitch is provided at the forward end of the wheeled frame with the wheeled frame having a wheel assembly associated therewith. The trailer includes a horizontally disposed and elongated first caster wheel support, having a forward end, a rearward end, an outer side, and an inner side. The first caster wheel support is secured to the wheeled frame at the forward end thereof at the first side thereof. The trailer also includes a horizontally disposed and elongated second caster wheel support, having a forward end, a rearward end, an outer side and an inner side. The second caster wheel support is secured to the wheeled frame at the forward end thereof at the second side thereof. The trailer also includes a horizontally disposed and elongated first drive wheel support, having a forward end, a rearward end, an outer side and an inner side. The first drive wheel support is secured to the wheeled frame at the rearward end thereof at the first side thereof. The trailer also includes a horizontally disposed and elongated second drive wheel support, having a forward end, a rearward end, an outer side and an inner side. The second drive wheel support is secured to the wheeled frame at the rearward end thereof at the second side thereof.

A first elongated ramp is associated with the first drive wheel support which extends rearwardly and downwardly from the rearward end of the first drive wheel support. A second elongated ramp is associated with the second drive wheel support which extends rearwardly and downwardly from the rearward end of the second drive wheel support.

The first caster wheel support has a caster wheel turner assembly thereon which is configured to partially pivot the second caster wheel as the swather is backed onto the trailer. The second caster wheel support has a caster wheel turner assembly thereon which is configured to partially pivot the first caster wheel as the swather is backed onto the trailer.

In the one embodiment, the first and second caster wheel supports are slidably moved inwardly and outwardly with respect to the wheeled frame. The first and second caster wheel supports could also be pivotally secured to the wheeled frame so as to be selectively movable between a horizontally disposed support position to a vertically disposed stowed position. In the preferred embodiment, the first and second drive wheel supports are selectively pivotally movable between a horizontally disposed support position and a vertically disposed stowed position with the aid of springs attached thereto.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a self-propelled swather such as manufactured by New Holland. Swather 10 includes a forward end 12, a rearward end 14, a first side 16 and a second side 18. Swather 10 has a pair of drive wheels 20 and 22 mounted thereon at the forward end thereof. Swather 10 also includes a pair of spaced-apart caster wheel assemblies 24 and 26 at its rearward end. When the swather is being driven forwardly, the axles 28 and 30 of the caster wheels 32 and 34 will be in a trailing or rearward position with respect to the pivot axes 36 and 38 of the caster wheel assemblies 24 and 26. When the swather 10 is backed onto the trailer, the caster wheel assemblies will pivot 180° from their normal trailing position.

The numeral 40 refers to the trailer of this invention for hauling the swather 10. Trailer 10 includes a wheeled frame 42, has a forward end 44, a rearward end 46, a first side 48 and a second side 50. Trailer 10 includes a hitch 52 at the forward end of the wheeled frame 42. Wheeled frame 42 includes longitudinally extending frame members 54 and 56. Cross-members 58, 60 and 62 are secured to and extend between frame members 54 and 56. A wheel assembly 63 is secured to frame members 54 and 56 in conventional fashion. Wheel assembly 63 includes fenders F1 and F2.

An elongated cross-tube 64 is secured to the lower ends of frame members 54 and 56 and extends therebetween at the forward ends thereof. An elongated cross-tube 66 is secured to the lower ends of frame members 54 and 56 and extends therebetween rearwardly of cross-tube 64.

Figure 4:
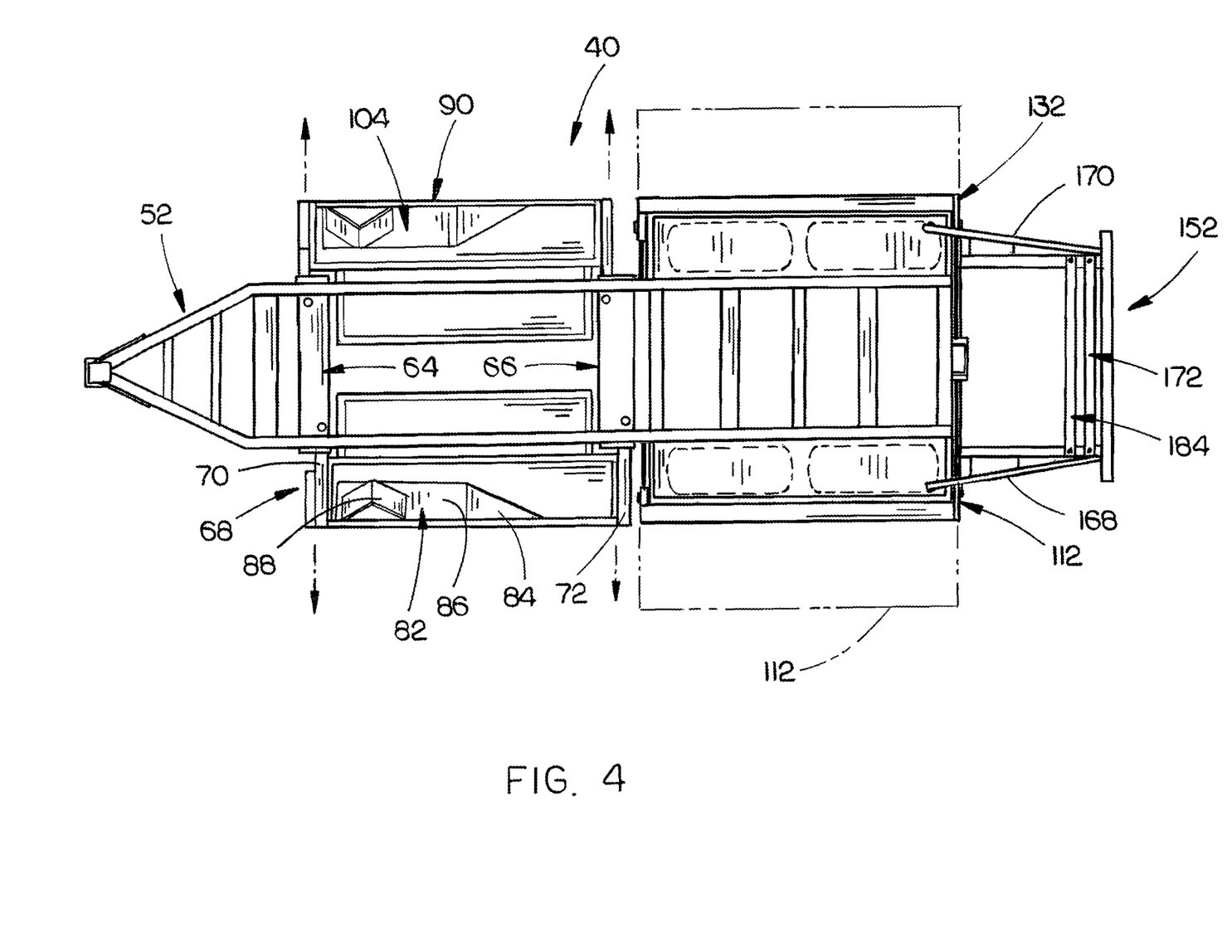
FIG. 4 is a top view of the trailer of FIG. 1 with the dashed lines illustrating the drive wheel supports in their horizontally disposed position.

The numeral 68 refers to a first caster wheel support having a support tube 70 at its forward end which is selectively adjustably received in one end of cross-tube 64. Support 68 also includes a support tube 72 at its rearward end which is selectively slidably adjustably received in one end of cross-tube 66 so that support 68 may be selectively adjustably mounted on wheeled frame 42 to accommodate different swathers. The support 68 may also be moved inwardly with respect to wheeled frame 42 to reduce the width of the trailer 40 when a swather is not being hauled by the trailer 40 (FIG. 4). Support 68 has an upstanding wheel guide 74 at its outer side. A platform or deck member 76 is secured to and extends between support tubes 70 and 72. Slots 78 and 80 are formed in deck member 76 to enable the deck member 76 to be moved inwardly with respect to frame member 54.

The numeral 82 refers to a swather caster wheel turn assembly which is mounted on deck member 76 at the outer side thereof. Assembly 52 includes an inclined and generally triangular-shaped rear wall 84, an inclined side wall 86, and a stop 88 at the forward end of side wall 86.

The numeral 90 refers to a second caster wheel support having a support tube 92 at its forward end which is selectively slidably adjustably received in the other end of cross-tube 64. Support 90 also includes a support tube 94 at its rearward end which is selectively slidably adjustably received in the other end of cross-tube 66 so that support 90 may be selectively adjustably mounted on wheeled frame 42 to accommodate different swatchers. The support 90 may also be moved inwardly with respect to wheeled frame 42 to reduce the width of the trailer 40 when a swather is not being hauled by the trailer 40. Support 90 has an upstanding wheel guide 96 at its outer side. A platform or deck member 98 is secured to and extended between support tubes 92 and 94. Slots 100 and 102 are formed in deck member 98 to enable the deck member 98 to be moved inwardly with respect to frame member 56.

The numeral 104 refers to a swather caster wheel turn assembly which is mounted on deck member 98 at the outer side thereof. Assembly 104 includes an inclined and generally triangular-shaped rear wall 106, an inclined side wall 108, and a stop 110 at the forward end of side wall 108.

Although the drawings illustrate that the caster wheel supports 68 and 90 are selectively horizontally slidably movable between stowed and support positions, the caster wheel supports 68 and 90 could be pivotally secured to the wheeled frame of the trailer so as to be selectively movable between a horizontally disposed support position to a vertically disposed stowed position.

Figure 6:
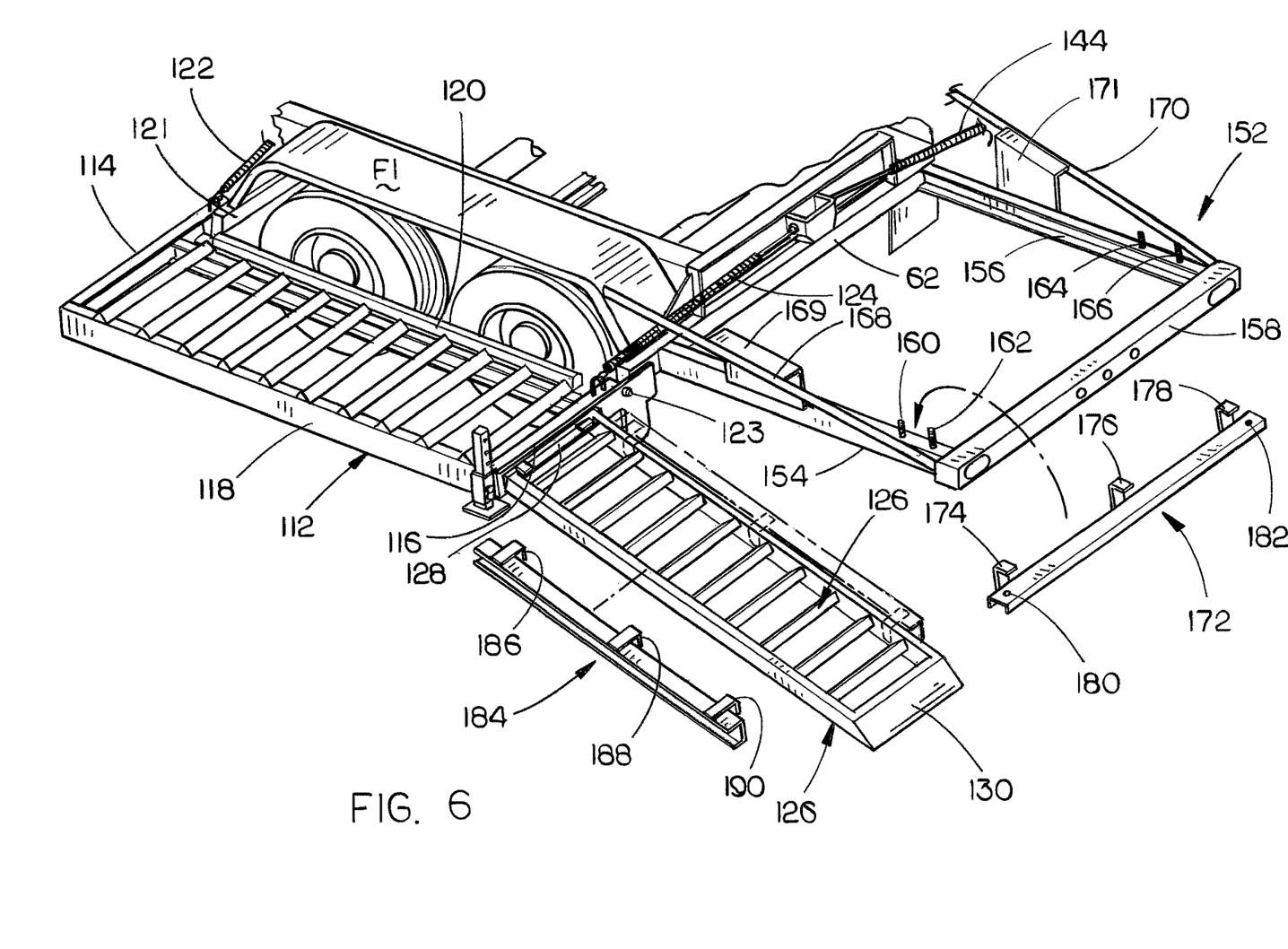
FIG. 6 is a partial rear exploded perspective view of the trailer of this invention.
Figure 7:
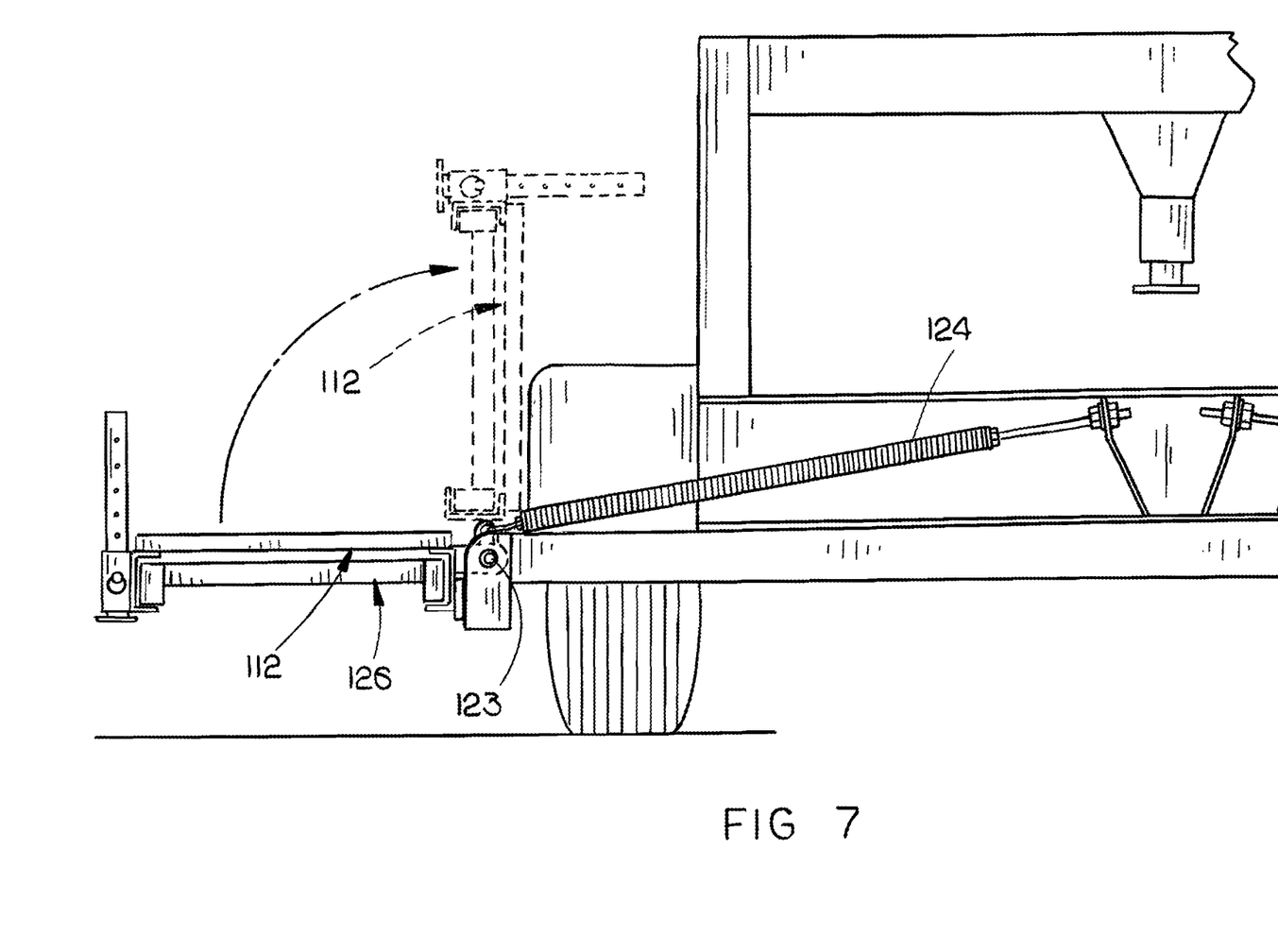
FIG. 7 is a partial end view illustrating one of the drive wheel supports in the horizontally disposed position with the broken lines illustrating the vertically disposed position of the drive wheel support.

The numeral 112 refers to a first drive wheel support which has a forward end 114, a rearward end 116, an outer side 118 and an inner side 120. The inner forward end of support 112 is pivotally secured to the wheeled frame 42 about a horizontal axis at 121 and the inner rearward end of support 112 is pivotally secured to wheeled frame 42 about a horizontal axis at 123. The support 112 is selectively movable between a horizontally disposed position to a vertically disposed position to reduce the width of the trailer when a swather is not loaded upon the trailer. A pair of springs 122 and 124 interconnect support 112 and the wheeled frame 42 to assist in raising the support 112 from its horizontally disposed position of FIG. 6 to its vertically disposed position as seen in FIG. 7.

An elongated first drive wheel ramp 126, having a forward end 128 and a rearward end 130, is selectively slidably mounted within the first drive wheel support 112 and is selectively movable between a stowed position within support 112 to a loading/unloading position wherein the forward end of ramp 122 is secured to the rearward end of support 112 and the rearward end of ramp 112 is in engagement with the ground.

The numeral 132 refers to a second drive wheel support which has a forward end 134, a rearward end 136, an outer side 138 and an inner side 140. The inner forward end of support 132 is pivotally secured to the wheeled frame 42 about a horizontal axis 141 and the inner rearward end of support 132 is pivotally secured to wheeled frame 42 about a horizontal axis at 142. The support 126 is selectively movable between a horizontally disposed position to a vertically disposed position to reduce the width of the trailer when a swather is not loaded upon the trailer. A pair of springs 142 and 144 interconnect the support 132 and the wheeled frame 42 to assist in raising the support 132 from its horizontally disposed position to its vertically disposed position.

An elongated second drive wheel 146 ramp having a forward end 148 and a rearward end 150, is selectively slidably mounted within the second drive wheel support 146 and is selectively movable between a stowed position within support 112 to a loading/unloading position wherein the forward end 148 of the ramp 146 is secured to the rearward end of support 132 and the rearward end of ramp 146 is in engagement with the ground.

The numeral 152 refers to a bumper which includes a first frame member 154 which has its forward end secured to cross-member 62, a second frame member 156 which has its forward end secured to cross-member 62, and a transversely extending frame member 158 which is secured to the rearward ends of frame members 154 and 156 and which extends therebetween. Frame member 156 has a pair of threaded studs 160 and 162 extending upwardly therefrom adjacent the rearward end thereof. Frame member 156 has a pair of threaded studs 164 and 166 extending upwardly therefrom adjacent the rearward end thereof.

The numeral 168 refers to an elongated tubular support which has its forward end secured to fender F1 and its rearward end secured to frame member 158. A support plate 169 has its upper end secured to tubular support 168 and has its lower end secured to frame member 154. The numeral 170 refers to an elongated tubular support which has its forward end secured to fender F2 and its rearward end secured to frame member 158. A support plate 171 has its upper end secured to tubular support 170 and has its lower end secured to frame member 156.

The numeral 172 refers to an elongated ramp extender which has three brackets 174, 176 and 178 extending therefrom. Extender 172 has bolt openings 180 and 182 formed therein adjacent the ends thereof. The numeral 184 refers to an elongated ramp extender which is identical to ramp extender 172 and which has three brackets 186, 188 and 190 therefrom. Normally, the extenders 172 and 184 are mounted on the frame members 154 and 156 with the studs 160, 162, 164 and 166 extending through the bolt openings in extenders 172 and 184.

The extenders 172 and 184 may be secured to the outer sides of ramps 126 and 132 to increase the widths thereof by extending the brackets 186, 188 and 190 over the outer side rail of ramp 126 and the brackets 174, 176 and 178 over the outer side rail of ramp 146. The extenders 172 and 184 may also be secured to the inner sides or rails of ramps 126 and 146.

When the trailer 40 is not being used to transport a swather 10, the caster wheel supports 76 and 90 will be in their inner positions adjacent frame members 54 and 56. At that time, the drive wheel supports 112 and 132 will be in their vertically disposed position so that the trailer may be moved over the highways and roads with a minimum width.

When it is desired to load a swather 10 on the trailer 40, the caster wheel supports 68 and 90 will be moved outwardly with respect to the frame members 54 and 56 to the desired position and locked in those positions. The drive wheel supports 112 and 132 will be moved from their vertically disposed positions to their horizontally disposed positions.

Figure 1:
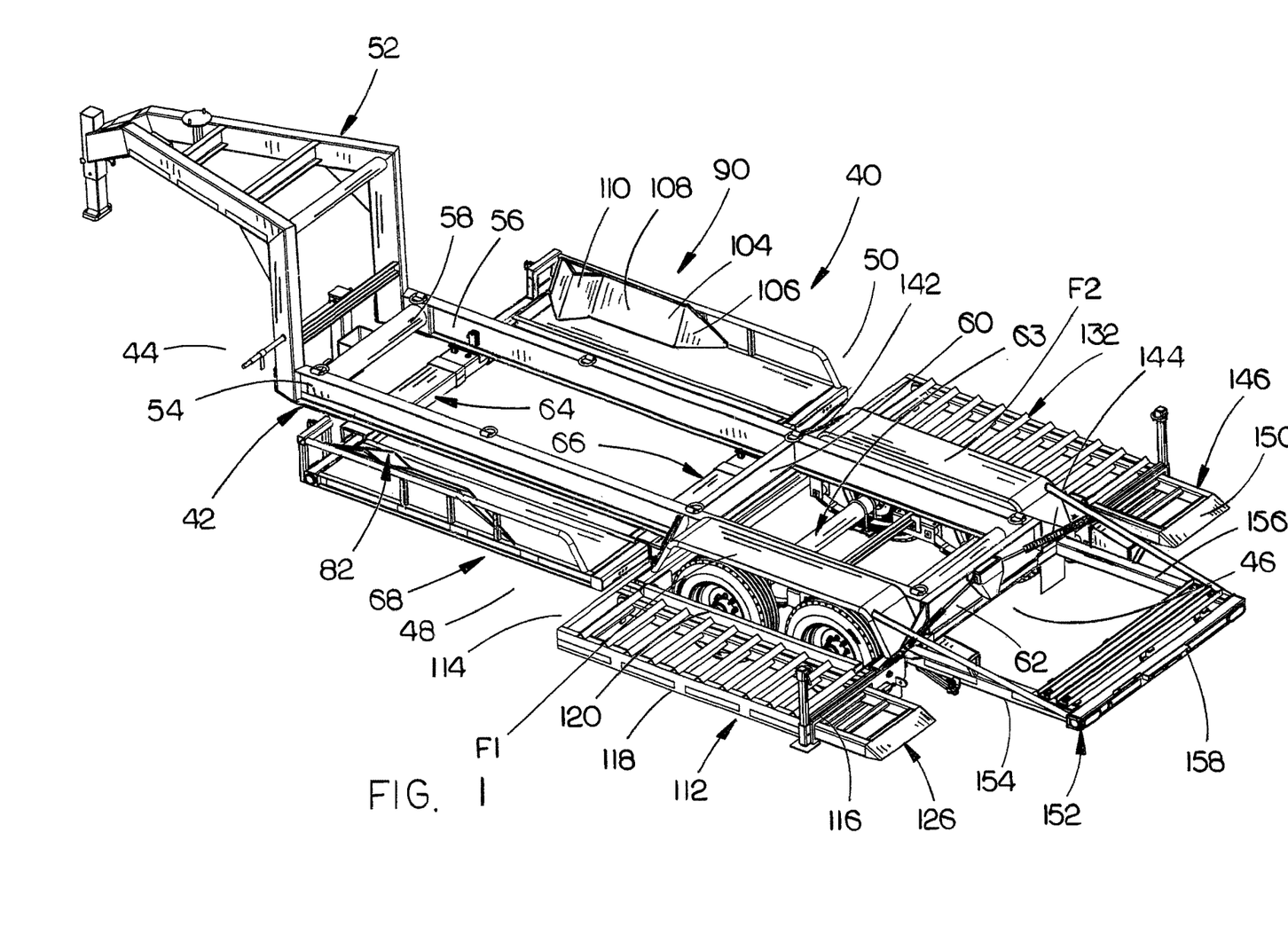
FIG. 1 is a rear perspective view of the trailer of this invention with the drive wheel supports in their horizontally disposed support position and the caster wheel supports in their inwardly retracted stowed position.
Figure 2:
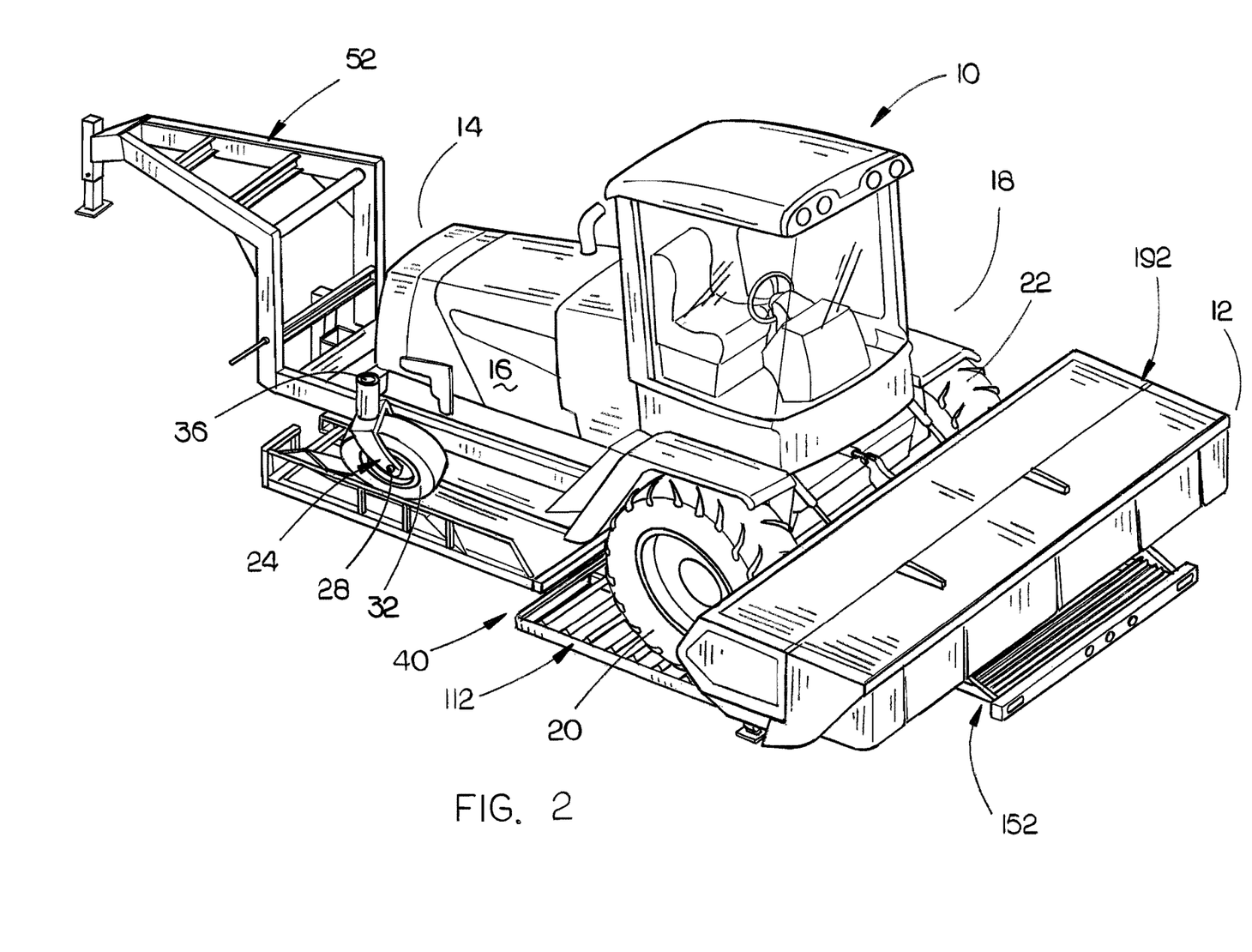
FIG. 2 is a perspective view illustrating a swather mounted on the trailer of FIG. 1.
Figure 2A:
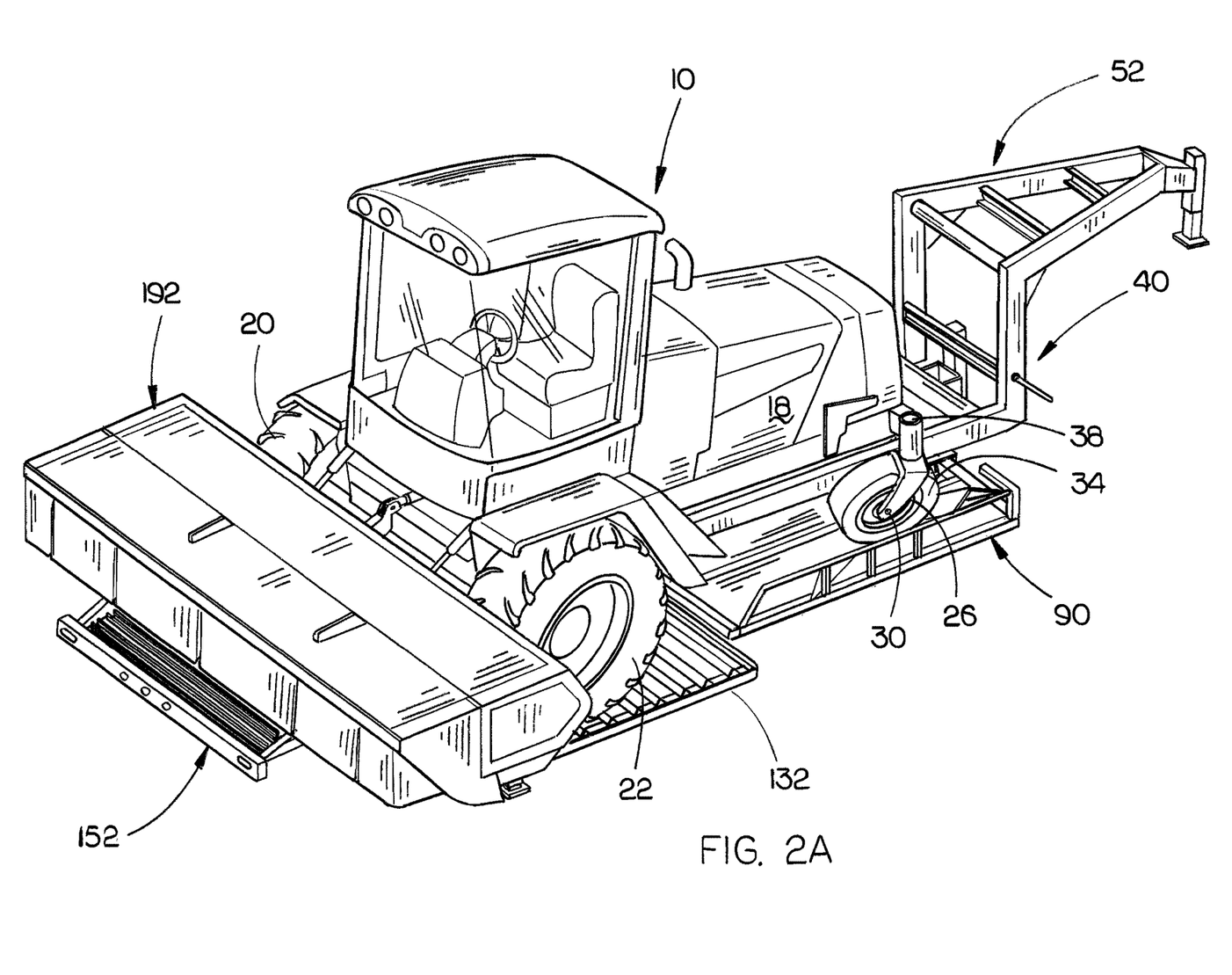
FIG. 2A is another perspective view of the swather mounted on the trailer of this invention.
Figure 3:
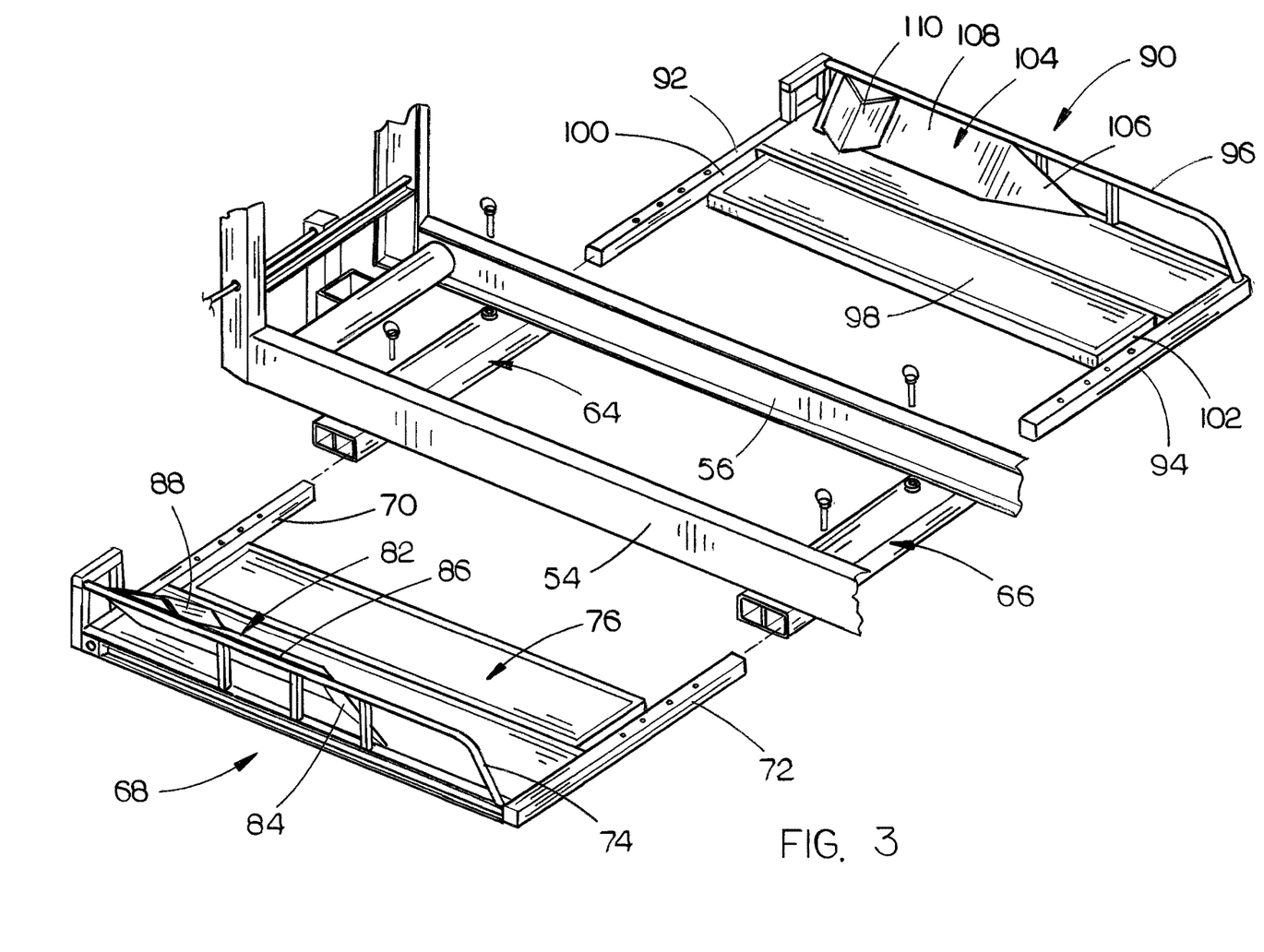
FIG. 3 is a partial exploded perspective view of the caster wheel supports and their relationship with respect to the longitudinally extending frame members of the trailer.
Figure 5:
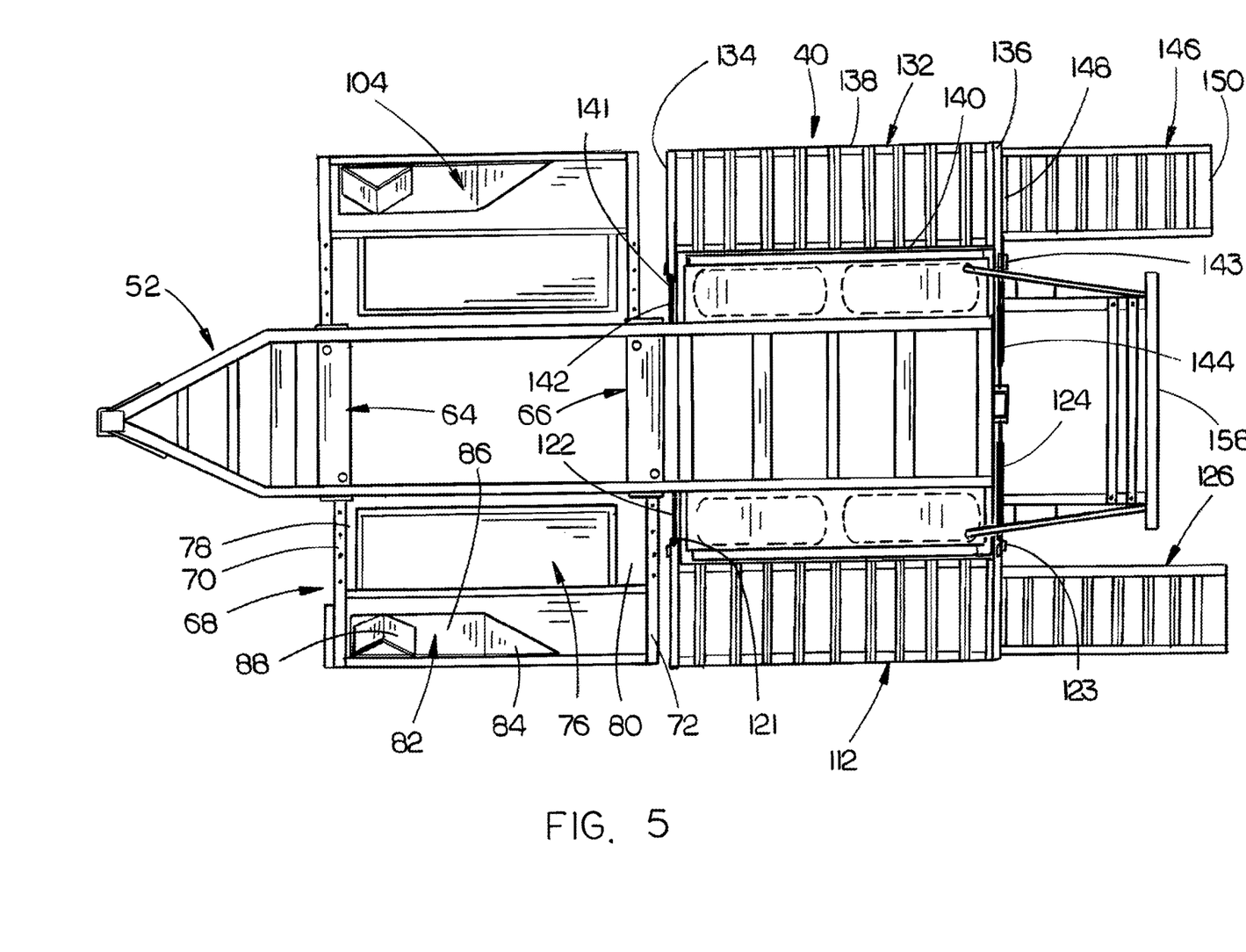
FIG. 5 is a top elevational view of the trailer of this invention with the caster wheel supports in their extended position, the drive wheel supports in their horizontally disposed position and the ramps in their operative position.

The ramps 126 and 146 will then be moved rearwardly from within drive wheel supports 112 and 132 to the positions illustrated in FIG. 5. The swather 10 will then be backed up to the trailer 40 so that the caster wheels 32 and 34 are aligned with the lower ends of the ramps 126 and 146 respectively. As the swather 10 is backed onto the trailer 40, the caster wheel assemblies 24 and 26 will be in the position such as illustrated in FIG. 2 so that the axles 28 and 30 thereof will be trailing position forwardly of the axes 36 and 38. The caster wheels 32 and 34 will pass upwardly and forwardly on the ramps 126 and 146, thence forwardly over the drive wheel supports 112 and 132, and thence onto the rearward ends of platforms 76 and 98. At that same time, drive wheels 20 and 22 will move forwardly onto ramps 126 and 146, thence onto drive wheel supports 112 and 132.

Figure 8:
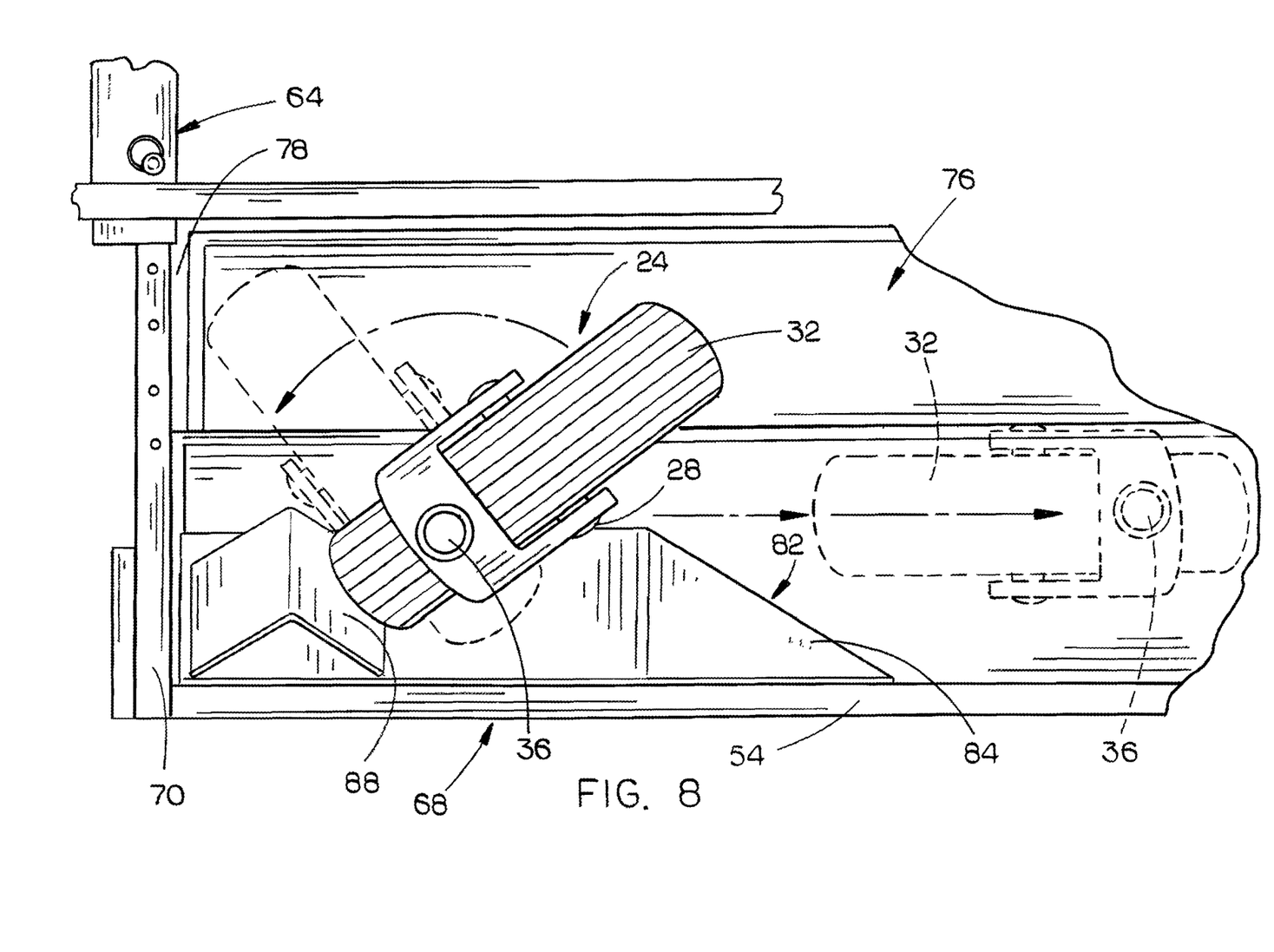
FIG. 8 is a partial top elevational view illustrating one of the caster wheel assemblies moving towards the front of the trailer and the caster wheel turner assembly.
Figure 9:
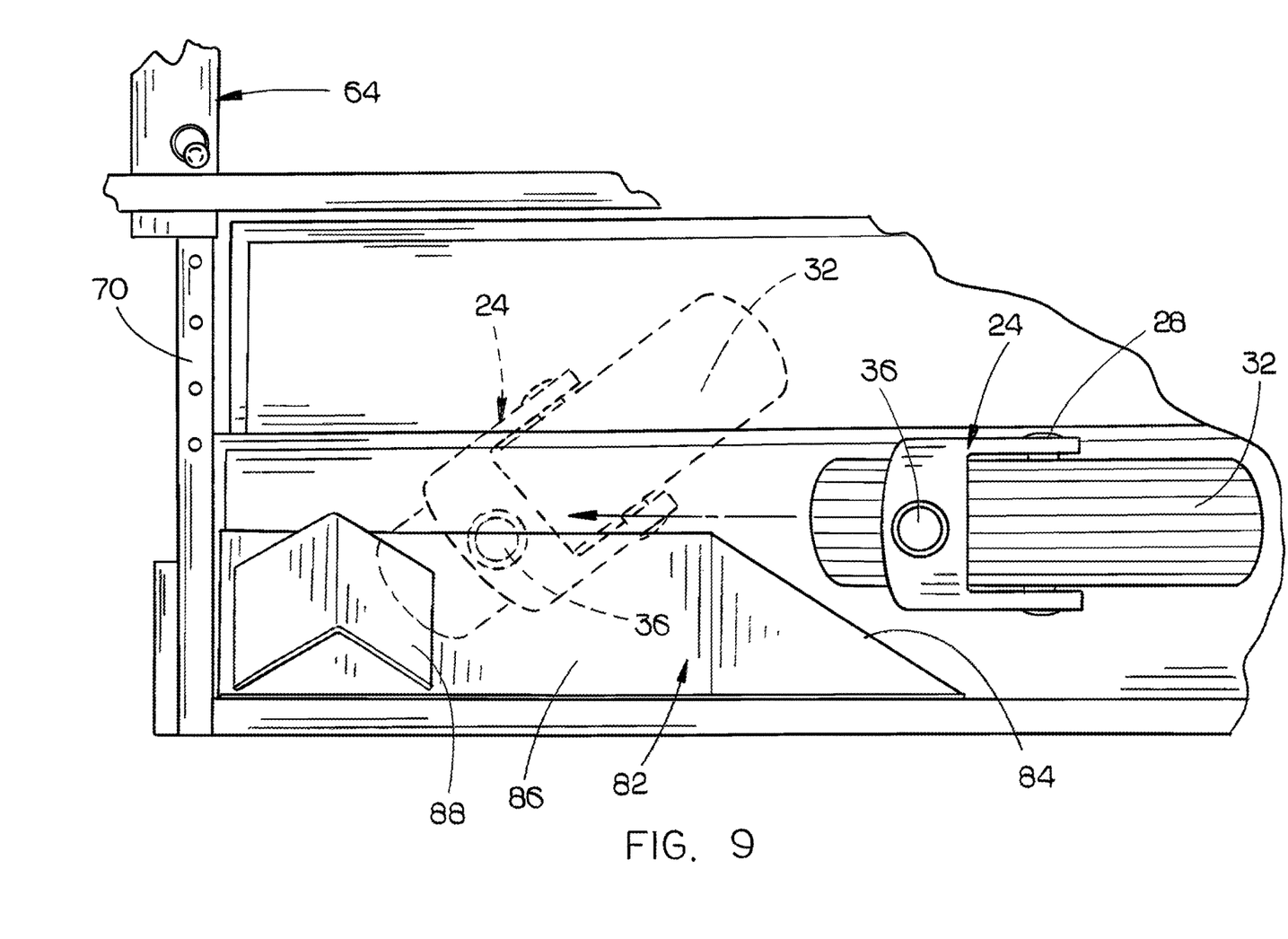
FIG. 9 is a view similar to FIG. 1 but which illustrates a caster wheel having been turned or pivoted by the caster wheel turner assembly.

As the caster wheels 32 and 34 move forwardly on supports 68 and 90, the wheels 32 and 34 engage the walls 84 at 106 respectively which causes the wheels 32 and 34 to pivot from the solid lines of FIG. 9 to the dashed line position illustrated in FIG. 9. When the wheels 32 and 34 engage the stops 88 and 110, the movement of the swather 10 is halted. At that time, the wheels 32 and 34 will be in the position of FIG. 8.

When the swather is stopped, the header 192 of the swather 10 is lowered onto the bumper 152 and the supports 168 and 170. When the swather 10 is so positioned on the trailer 10, the ramps 126 and 146 are again stowed within supports 112 and 132 respectively. When the trailer 40 and swather 10 have been moved to the desired location, the ramps 126 and 146 are moved from within supports 112 and 132 respectively and positioned in the unloading position. The swather 10 is then driven from the trailer 40. Since the caster wheels 32 and 34 are in the angled position such as seen in FIG. 8, the initial unloading movement of the swather 10 from the trailer 40 causes caster wheels 32 and 34 to pivot as indicated by the arrows in FIG. 8 from the solid line position to the broken line position so that the wheels 32 and 34 properly trail the swather as the swather is driven from the trailer 40.

To summarize somewhat, the instant invention has at least three or more novel features not found in the prior art. First, the bumper 152 of the trailer 40 not only serves as a bumper at the rear end of the trailer 40 but also provides a means for stowing the extenders 172 and 184 when the extenders are not being used. Second, the bumper 152 and the supports 168 and 170 provide a structure for supporting the header of the swather 10 during transport.

Another novel feature of the trailer 10 is the caster wheel turn assemblies 82 and 104 which partially turn the caster wheels 32 and 34 as the swather 10 is loaded onto the trailer 40 so that when the swather 10 is driven from the trailer 40, the caster wheels 32 and 34 will pivot to the proper trailing position.

Yet another novel feature of the trailer 40 is that the first and second drive wheel supports 112 and 132 are easily moved from their horizontally disposed positions to their vertically disposed positions with the assistance of the springs 122, 124, and 142, 144.

Further, the trailer 40 of the invention can accommodate various sizes of swathers.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A trailer for a self-propelled swather with the swather having a forward end, a rearward end, a first side, a second side, a first drive wheel at said first side thereof adjacent said forward end thereof, a second drive wheel at said second side thereof adjacent said forward end thereof, a first caster wheel at said first side adjacent said rearward end thereof, a second caster wheel at said second side adjacent said rearward end thereof, with the forward end of the swather configured to have a swather head selectively removably attached thereto, comprising:

a wheeled frame having a forward end, a rearward end, a first side and a second side;
a hitch at said forward end of said wheeled frame;
a first wheel assembly mounted on said wheeled frame at said first side thereof;
a second wheel assembly mounted on said wheeled frame at said second side thereof;
a horizontally disposed and elongated first caster wheel support, having a forward end, a rearward end, an outer end, and an inner end;
said first caster wheel support being secured to said wheeled frame at said forward end thereof at said first side thereof;
an upstanding and elongated first caster wheel guide having a forward end, a rearward end, a lower end, an upper end, an inner side and an outer side;
said lower end of said first caster wheel guide being secured to said outer end of said first caster wheel support so that said first caster wheel guide extends upwardly from said outer end of said first caster wheel support;
said first caster wheel guide including a first caster wheel turner assembly;
a horizontally disposed and elongated second caster wheel support, having a forward end, a rearward end, an outer side, and an inner side;
said second caster wheel support being secured to said wheeled frame at said forward end thereof at said second side thereof;
an upstanding and elongated second caster wheel guide having a forward end, a rearward end, a lower end, an upper end, an inner side and an outer side;
said lower end of said second caster wheel guide being secured to said outer end of said second caster wheel support so that said second caster wheel guide extends upwardly from said outer end of said caster wheel support;
said second caster wheel guide including a second caster wheel turner assembly;
a horizontally disposed and elongated first drive wheel support, having a forward end, a rearward end, an outer side and an inner side;
said first drive wheel support being secured to said wheeled frame at said rearward end thereof at said first side thereof;
a horizontally disposed and elongated second drive wheel support, having a forward end, a rearward end, an outer side and an inner side;
said second drive wheel support being secured to said wheeled frame at said rearward end thereof at said second side thereof;
a first elongated ramp associated with said first drive wheel support which extends rearwardly and downwardly from said rearward end of said first drive wheel support;
a second elongated ramp associated with said second drive wheel support which extends rearwardly and downwardly from said rearward end of said second drive wheel support;
said first elongated ramp and said first drive wheel support being configured to have the second drive wheel of the swather move forwardly thereover as the swather is backed onto the trailer;
said second elongated ramp and said second drive wheel support being configured to have the first drive wheel of the swather move forwardly thereover as the swather is backed onto the trailer;
said first caster wheel support being configured to have the second caster wheel of the swather to move forwardly thereover as the swather is backed onto the trailer;
said second caster wheel support being configured to have the first caster wheel of the swather to move forwardly thereover as the swather is backed onto the trailer;
said first and second drive wheel supports being selectively pivotally movable between a horizontally disposed position and a vertically disposed position to narrow the width of the trailer for transport when a swather is not positioned on the trailer; and
each of said first and second drive wheel supports having a spring means associated therewith to assist the movement of drive wheel support from its horizontally disposed position to its vertically disposed position.

2. The trailer of claim 1 further including extenders for selective attachment to said first and second ramps to widen or narrow said first and second ramps.

3. The trailer of claim 2 wherein said rearward end of said wheeled frame includes a bumper and wherein said extenders are configured to be mounted on said bumper when not being used.

4. The trailer of claim 3 wherein said bumper is configured to have the swather head positioned thereon.

5. A trailer for a self-propelled swather with the swather having a forward end, a rearward end, a first side, a second side, a first drive wheel at said first side thereof adjacent said forward end thereof, a second drive wheel at said second side thereof adjacent said forward end thereof, a first caster wheel assembly secured to the swather at the first side of the swather adjacent the rearward end of the swather with said first caster wheel assembly including a first caster wheel rotatably on a horizontally disposed first axle with said first axle and said first wheel being pivotally secured to said first side of the swather about a first vertical axis with said first axle being in a trailing position with respect to said first vertical axis when the swather is being driven forwardly, a second caster wheel assembly secured to the swather at the second side of the swather adjacent the rearward end of the swather with said second caster wheel assembly including a second caster wheel rotatably mounted on a horizontally disposed second axle with said second axle and said second caster wheel being pivotally secured to the second side of the swather about a second vertical axis with said second axle being in a trailing position with respect to said second vertical axis when the swather is being driven forwardly, and with the forward end of the swather configured to have a swather head selectively removably attached thereto, comprising:

a wheeled frame having a forward end, a rearward end, a first side and a second side;

a hitch at said forward end of said wheeled frame;

a first wheel assembly mounted on said wheeled frame at said first side thereof;

a second wheel assembly mounted on said wheeled frame at said second side thereof;

a horizontally disposed and elongated first caster wheel support, having a forward end, a rearward end, an outer end, and an inner end;

said first caster wheel support being secured to said wheeled frame at said forward end thereof at said first side thereof;

an upstanding and elongated first caster wheel guide having a forward end, a rearward end, a lower end, an upper end, an inner side and an outer side;

said lower end of said first caster wheel guide being secured to said outer end of said first caster wheel support so that said first caster wheel guide extends upwardly from said outer end of said first caster wheel support;

a horizontally disposed and elongated second caster wheel support, having a forward end, a rearward end, an outer end, and an inner end;

said second caster wheel support being secured to said wheeled frame at said forward end thereof at said second side thereof;

an upstanding and elongated second caster wheel guide having a forward end, a rearward end, a lower end, an upper end, an inner side and an outer side;

said lower end of said second caster wheel guide being secured to said outer end of said second caster wheel support so that said second caster wheel guide extends upwardly from said outer end of said caster wheel support;

a horizontally disposed and elongated first drive wheel support, having a forward end, a rearward end, an outer side and an inner side;

said first drive wheel support being secured to said wheeled frame at said rearward end thereof at said first side thereof;

a horizontally disposed and elongated second drive wheel support, having a forward end, a rearward end, an outer side and an inner side;

said second drive wheel support being secured to said wheeled frame at said rearward end thereof at said second side thereof;

a first elongated ramp associated with said first drive wheel support which extends rearwardly and downwardly from said rearward end of said first drive wheel support;

a second elongated ramp associated with said second drive wheel support which extends rearwardly and downwardly from said rearward end of said second drive wheel support;

said first elongated ramp and said first drive wheel support being configured to have the second drive wheel of the swather move forwardly thereover as the swather is backed onto the trailer;

said second elongated ramp and said second drive wheel support being configured to have the first drive wheel of the swather move forwardly thereover as the swather is backed onto the trailer;

said first caster wheel support being configured to have the second caster wheel of the swather move forwardly thereover as the swather is backed onto the trailer;

said second caster wheel support being configured to have the first caster wheel of the swather move forwardly thereover as the swather is backed onto the trailer;

said inner side of said first caster wheel guide having an angular first caster wheel turner assembly, having forward and rearward ends, protruding inwardly therefrom which is configured to be engaged by the second caster wheel to partially pivot the second caster wheel about the second vertical axis of the second caster wheel assembly in a counter clock-wise manner as viewed from above as the swather is backed onto the trailer; and said inner side of said second caster wheel guide having an angular second caster wheel turner assembly, having forward and rearward ends, protruding inwardly therefrom which is configured to be engaged by the first caster wheel to partially pivot the first caster wheel above the second vertical axis of the first caster wheel assembly in a clock-wise manner as viewed from above as the swather is backed onto the trailer.

6. The trailer of claim 5 wherein each of said first and second caster wheel turner assemblies includes a protruding wheel stop at said forward end thereof.

7. A trailer for a self-propelled swather with the swather having a forward end, a rearward end, a first side, a second side, a first drive wheel at said first side thereof adjacent said forward end thereof, a second drive wheel at said second side thereof adjacent said forward end thereof, a first caster wheel at said first side thereof adjacent said rearward end thereof, a second caster wheel at said second side thereof adjacent said rearward end thereof, with the forward end of the swather configured to have a swather head selectively removably attached thereto, comprising:

a wheeled frame having a forward end, a rearward end, a first side and a second side;

a hitch at said forward end of said wheeled frame;

a first wheel assembly mounted on said wheeled frame at said first side thereof;

a second wheel assembly mounted on said wheeled frame at said second side thereof;

a horizontally disposed and elongated first caster wheel support, having a forward end, a rearward end, an outer side, and an inner side;

said first caster wheel support being secured to said wheeled frame at said forward end thereof at said first side thereof;

a horizontally disposed and elongated second caster wheel support, having a forward end, a rearward end, an outer side, and an inner side;

said second caster wheel support being secured to said wheeled frame at said forward end thereof at said second side thereof;

a horizontally disposed and elongated first drive wheel support, having a forward end, a rearward end, an outer side and an inner side;

said first drive wheel support being secured to said wheeled frame at said rearward end thereof at said first side thereof;

a horizontally disposed and elongated second drive wheel support, having a forward end, a rearward end, an outer side and an inner side;

said second drive wheel support being secured to said wheeled frame at said rearward end thereof at said second side thereof;

a first elongated ramp associated with said first drive wheel support which extends rearwardly and downwardly from said rearward end of said first drive wheel support;

a second elongated ramp associated with said second drive wheel support which extends rearwardly and downwardly from said rearward end of said second drive wheel support;

said first ramp and said first drive wheel support being configured to have the second drive wheel of the swather move forwardly thereover as the swather is backed onto the trailer;

said second ramp and said second drive wheel support being configured to have the first drive wheel of the swather move forwardly thereover as the swather is backed onto the trailer;

said first caster wheel support being configured to have the second caster wheel of the swather move forwardly thereover as the swather is backed onto the trailer;

said second caster wheel support being configured to have the first caster wheel of the swather move forwardly thereover as the swather is backed onto the trailer;

said first caster wheel support having a caster wheel turner assembly thereon which is configured to partially pivot the second caster wheel as the swather is backed onto the trailer; and said second caster wheel support having a caster wheel turner assembly thereon which is configured to partially pivot the first caster wheel as the swather is backed onto the trailer.

8. The trailer of claim 7 wherein each of said caster wheel turner assemblies' members includes a wheel stop.

9. The trailer of claim 7 wherein each of said caster wheel supports are selectively slidably movable between stowed and support positions with respect to said wheeled frame.

10. A trailer for a self-propelled swather with the swather having a forward end, a rearward end, a first side, a second side, a first drive wheel at said first side thereof adjacent said forward end thereof, a second drive wheel at said second side thereof adjacent said forward end thereof, a first caster wheel assembly secured to the swather at the first side of the swather adjacent the rearward end of the swather with said first caster wheel assembly including a first caster wheel rotatably on a horizontally disposed first axle with said first axle and said first wheel being pivotally secured to said first side of the swather about a first vertical axis with said first axle being in a trailing position with respect to said first vertical axis when the swather is being driven forwardly, a second caster wheel assembly secured to the swather at the second side of the swather adjacent the rearward end of the swather with said second caster wheel assembly including a second caster wheel rotatably mounted on a horizontally disposed second axle with said second axle and said second caster wheel being pivotally secured to the second side of the swather about a second vertical axis with said second axle being in a trailing position with respect to said second vertical axis when the swather is being driven forwardly, and with the forward end of the swather configured to have a swather head selectively removably attached thereto, comprising:

a wheeled frame having a forward end, a rearward end, a first side and a second side;

a hitch at said forward end of said wheeled frame;

a first wheel assembly mounted on said wheeled frame at said first side thereof;

a second wheel assembly mounted on said wheeled frame at said second side thereof;

a horizontally disposed and elongated first caster wheel support, having a forward end, a rearward end, an outer end, and an inner end;

said first caster wheel support being secured to said wheeled frame at said forward end thereof at said first side thereof;

an upstanding and elongated first caster wheel guide having a forward end, a rearward end, a lower end, an upper end, an inner side and an outer side;

said lower end of said first caster wheel guide being secured to said outer end of said first caster wheel support so that said first caster wheel guide extends upwardly from said outer end of said first caster wheel support;

a horizontally disposed and elongated second caster wheel support, having a forward end, a rearward end, an outer end, and an inner end;

said second caster wheel support being secured to said wheeled frame at said forward end thereof at said second side thereof;

an upstanding and elongated second caster wheel guide having a forward end, a rearward end, a lower end, an upper end, an inner side and an outer side;

said lower end of said second caster wheel guide being secured to said outer end of said second caster wheel support so that said second caster wheel guide extends upwardly from said outer end of said caster wheel support;

a horizontally disposed and elongated first drive wheel support, having a forward end, a rearward end, an outer side and an inner side;

said first drive wheel support being secured to said wheeled frame at said rearward end thereof at said first side thereof;

a horizontally disposed and elongated second drive wheel support, having a forward end, a rearward end, an outer side and an inner side;

said second drive wheel support being secured to said wheeled frame at said rearward end thereof at said second side thereof;

a first elongated ramp associated with said first drive wheel support which extends rearwardly and downwardly from said rearward end of said first drive wheel support;

a second elongated ramp associated with said second drive wheel support which extends rearwardly and downwardly from said rearward end of said second drive wheel support;

said first elongated ramp and said first drive wheel support being configured to have the second drive wheel of the swather move forwardly thereover as the swather is backed onto the trailer;

said second elongated ramp and said second drive wheel support being configured to have the first drive wheel of the swather move forwardly thereover as the swather is backed onto the trailer;

said first caster wheel support being configured to have the second caster wheel of the swather move forwardly thereover as the swather is backed onto the trailer;

said second caster wheel support being configured to have the first caster wheel of the swather move forwardly thereover as the swather is backed onto the trailer;

said inner side of said first caster wheel guide having an angular first caster wheel turner assembly, having forward and rearward ends, protruding inwardly therefrom which is configured to be engaged by the second caster wheel to partially pivot the second caster wheel about the second vertical axis of the second caster wheel assembly in a counter clock-wise manner as viewed from above as the swather is backed onto the trailer;

said inner side of said second caster wheel guide having an angular second caster wheel turner assembly, having forward and rearward ends, protruding inwardly therefrom which is configured to be engaged by the first caster wheel to partially pivot the first caster wheel above the second vertical axis of the first caster wheel assembly in a clock-wise manner as viewed from above as the swather is backed onto the trailer; and each of said first and second caster wheel turner assemblies including an inclined and generally triangular-shaped rear wall, having a rearward end and a forward end, an inclined side wall, having rearward and forward ends, which extends forwardly from said forward end of said generally triangular-shaped rear wall, and an upstanding stop at the forward end of said inclined side wall which extends outwardly and rearwardly from said inclined side wall.

\* \* \* \* \*